(No Model.)

J. BARNES.
CORKSCREW.

No. 299,100. Patented May 27, 1884.

WITNESSES
Wm A Lowe
Charles G Coe

INVENTOR
Joshua Barnes

UNITED STATES PATENT OFFICE.

JOSHUA BARNES, OF BROOKLYN, NEW YORK.

CORKSCREW.

SPECIFICATION forming part of Letters Patent No. 299,100, dated May 27, 1884.

Application filed January 19, 1884. (No model.)

*To all whom it may concern:*

Be it known that I, JOSHUA BARNES, of the city of Brooklyn, of the county of Kings and State of New York, have invented a new and useful Improvement in Corkscrews, of which the following, taken in connection with the accompanying drawings, is a full, clear, and accurate description.

The object of my invention is to make an improved corkscrew which shall be cheaper and better than those now ordinarily used.

The principal part of my invention relates to corkscrews in which the shank of the screw-coil is pivoted on an axis secured to a handle, so that the screw-coil turns in or folds within the handle. Such folding corkscrews have hitherto been made with the jaws of the handle concave or hollowed out; and my improvement in this class of corkscrews consists in making the jaws of the handle convex and fitting into corresponding concavities in the shank of the screw-coil, by which means a stronger and much cheaper corkscrew is produced. Another part of my invention consists in forming at or near the end of the screw-coil a cutting-edge, or making it at or near the end with the cutting-edge wider than the remainder of the screw-coil, so that it will cut better into the cork and allow the remainder of the screw-coil to go in with less friction. This improvement can be used in a double or single screw-coil, as desired. Connected with these improvements I have several other minor details.

Figure 1:
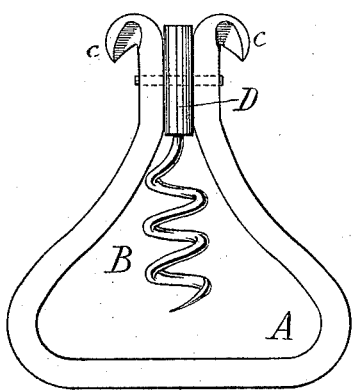
Figure 2:
Figure 3:
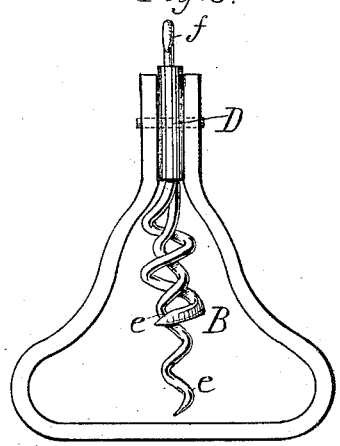
Figure 4:
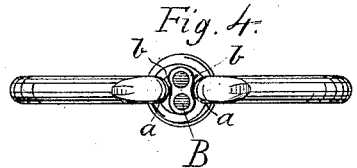
Figure 5:
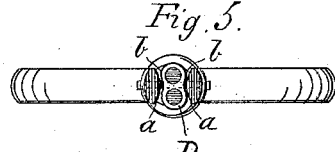
Figure 6:
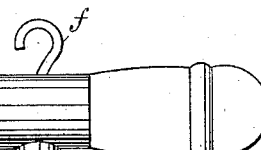

In the drawings, Figure 1 shows my improvement with folding handle and convex jaws, the handle being provided with hooks, and the screw-coil being a single one with the usual round point. Fig. 2 shows one detail of my improvement, to be explained hereinafter. Fig. 3 shows my improvement with folding handle and convex jaws, the double screw-coil being provided with a hook and showing the wide cutting-edge in the screw-coil. Fig. 4 is a section of Fig. 1, and Fig. 5 is a cross-section of Fig. 3. Fig. 6 shows a double screw-coil with cutting-edges near the ends of the screw-coil, and metallic strengthening-bands connecting the screw-coil with the handle, which is provided with a hook.

On Fig. 1, A represents the folding handle, provided with convex jaws $a$, fitting into corresponding concavities, $b$, in the shank of the screw-coil B, which is clearly shown in Fig. 4. The covering of the shank of the screw-coil consists of a metallic or other proper material, D, to prevent the wires of the screw-coil from separating. These parts are more fully shown in Fig. 4.

In Fig. 3, A represents the folding handle, and B a double screw-coil, provided near its points with cutting-edges $e$, made wider than the remainder of the coil by flattening or broadening the wire, so that the remainder of the screw-coil will enter the cork with less friction. The screw-coil in this figure is provided with a single hook, $f$. The convex jaws $a$ of the handle A fit into corresponding concavities, $b$, of the shank of the screw-coil. These parts are fully shown in Fig. 5.

In Fig. 6, A represents the handle; B, a double screw-coil, which shows the cutting-edges $e$ at or near their ends. The handle A is connected with the screw-coil B by a metallic connection, C, which is run around the wires forming the shank of the screw-coil B and around the center of the handle. This metallic connection C terminates in a plate or stop, $h$, at the base of the screw-coil B.

In making the corkscrew with folding handle the shank of the screw-coil may be formed of two parallel pieces, formed either of a single wire doubled over or of two separate pieces of wire. These parallel wires are preferably separated a little, so that in drilling the hole to receive the pivot or axis of the handle only a portion of the material is taken from each wire and the strength of the shank is not impaired. This arrangement is clearly shown in Fig. 2, in which $g$ represents the parallel wires, and $k$ the hole drilled for the pivot to pass through. These wires may be prevented from spreading by the shoulder shown in Fig. 2, or by the metallic covering D, as shown in Figs. 1 and 3, or by other suitable means.

Having thus described my invention, what I claim, and desire to secure by Letters Patent, is—

1. A corkscrew with a folding handle provided with convex jaws fitting into corresponding concavities in the shank of a screw-coil.

2. In a corkscrew, a screw-coil, either single or double, provided near its point or points with a cutting-edge.

3. The screw-coil of a corkscrew, formed with the portion at or near its point wider than the remainder of the screw-coil, and forming a cutting-edge.

4. A corkscrew with a folding handle, provided with convex jaws fitting into corresponding concavities in the shank of the screw-coil, and provided with a hook or hooks, substantially as described.

5. In a corkscrew, a folding handle provided with convex jaws fitting into corresponding concavities in the shank of a double or single screw-coil, which has near its point or points a cutting-edge.

6. In a corkscrew, a folding handle provided with convex jaws fitting into corresponding concavities in the shank of a single or double screw-coil which has the portion at or near the point or points formed into a cutting-edge and made wider than the remainder of the screw-coil, substantially as described.

7. In a corkscrew, the shank of a screw-coil formed of parallel wires, provided with a hole drilled therein, and prevented from separating by means as described.

In testimony whereof I have hereunto set my hand this 17th day of January, 1884.

JOSHUA BARNES.

In presence of—
CHARLES G. COE,
R. F. VAN BOSKERCK.